United States Patent [19]

Guzik et al.

[11] Patent Number: 5,737,443
[45] Date of Patent: Apr. 7, 1998

[54] METHOD OF JOINING HANDWRITTEN INPUT

[75] Inventors: Kenneth J. Guzik, Santa Clara; Alan Paul Huff, Fremont; John L. C. Seybold, Portola Valley, all of Calif.

[73] Assignee: Motorola, Inc., Schaumburg, Ill.

[21] Appl. No.: 339,524

[22] Filed: Nov. 14, 1994

[51] Int. Cl.[6] .................. G06K 9/00; G06K 9/34; G06K 9/03
[52] U.S. Cl. .................. 382/188; 382/177; 382/311
[58] Field of Search .................. 382/186–189, 382/178–179, 309–311, 197, 202; 358/504, 406; 364/550, 557, 264, 943.5

[56] References Cited

U.S. PATENT DOCUMENTS

| | | | |
|---|---|---|---|
| 4,680,803 | 7/1987 | DiIella | 382/140 |
| 4,680,804 | 7/1987 | Kazunuki et al. | 382/185 |
| 4,727,588 | 2/1988 | Fox et al. | 382/177 |
| 4,811,412 | 3/1989 | Katsurada | 382/179 |
| 4,847,912 | 7/1989 | Tanaka et al. | 382/177 |
| 4,850,025 | 7/1989 | Abe | 382/177 |
| 4,887,227 | 12/1989 | Tusjioka et al. | 382/177 |
| 4,953,225 | 8/1990 | Togawa et al. | 382/179 |
| 4,972,496 | 11/1990 | Laren et al. | 382/202 |
| 5,003,614 | 3/1991 | Tanaka et al. | 382/171 |
| 5,033,097 | 7/1991 | Nakamura | 382/177 |

*Primary Examiner*—Leo Boudreau
*Assistant Examiner*—Bipin Shalwala
*Attorney, Agent, or Firm*—J. Ray Wood

[57] ABSTRACT

The present invention provides a user with the option of editing handwritten input such that the user may elect to join or combine one or more discrete continous segments, or blocks of ink, to form a single discrete continous segement. The joined segments are then presented as a single discrete segment and analyzed as a single discrete segement by the method of machine recognition of handwritten input being employed by a device that functions to receive handwritten input.

24 Claims, 3 Drawing Sheets

METHOD OF JOINING HANDWRITTEN INPUT

FIELD OF THE INVENTION

This invention relates generally to handwriting recognition, and more particularly to the selection input and editing of discrete continuous segments of handwritten input.

BACKGROUND OF THE INVENTION

Machine recognition of human handwriting is a very difficult problem, and with the recent explosion of pen-based computing devices, has become an important problem to be addressed. Machine recognition of human handwriting has various present applications.

One example of the current application for machine recognition of human handwriting is found in personal digital assistants, such as the Newton™ product and other types of pen based computing devices. Typically these type of products have a touch sensitive screen upon which a user can impose handwriting. These devices then function to digitize the handwritten input, such as alphanumeric input, and thereafter process the input in an attempt to recognize the information content of the handwriting.

Pursuant to one prior art handwriting recognition technique, one makes a best determination as to the identity of each alphanumeric character in sequence, with the resulting string of characters comprising the result of the recognition activity. There are a variety of drawbacks to this approach. It is hindered by the difficulty of identifying spatial boundaries of the candidate inputs (in this case alphanumeric characters to be recognized). When these boundaries are not located correctly, it is impossible to recognize the character accurately, since it will either be lacking pieces or will incorporate extraneous material from adjacent characters.

One significant problem with machine recognition of human handwriting is the ability to recognize the end of one input and the beginning of the next input. For example, a significant problem exists in locating the end of one handwritten input segment, word, or alphanumeric input, from the beginning of the subsequent handwritten input segment, word, or alphanumeric input. Poor recognition of the handwritten input results in poor, inaccurate interpretation of the information content of the handwritten input. This problem is accented by poor input practices of the user or input device, such as poor penmanship or handwriting habits. Machine recognition of handwritten input may incorrectly split a single segment of handwritten input into two or more segments, and recognize them as them as two or more segments. Alternatively, a user may feel the need to combine or join one or more handwritten input segments after such segments have been entered as separate handwritten input segments.

Accordingly, a need exists for a handwriting recognition technique that allows a user or input device to enter a selection input edit instruction that permits the user, or input device, to join one or more discrete continuous segments to form a single continuous discrete segment for recognition and display and thereby provide a more accurate interpretation of the information content of the handwritten input.

DETAILED DESCRIPTION OF THE PREFERRED EMBODIMENTS

Figure 1:
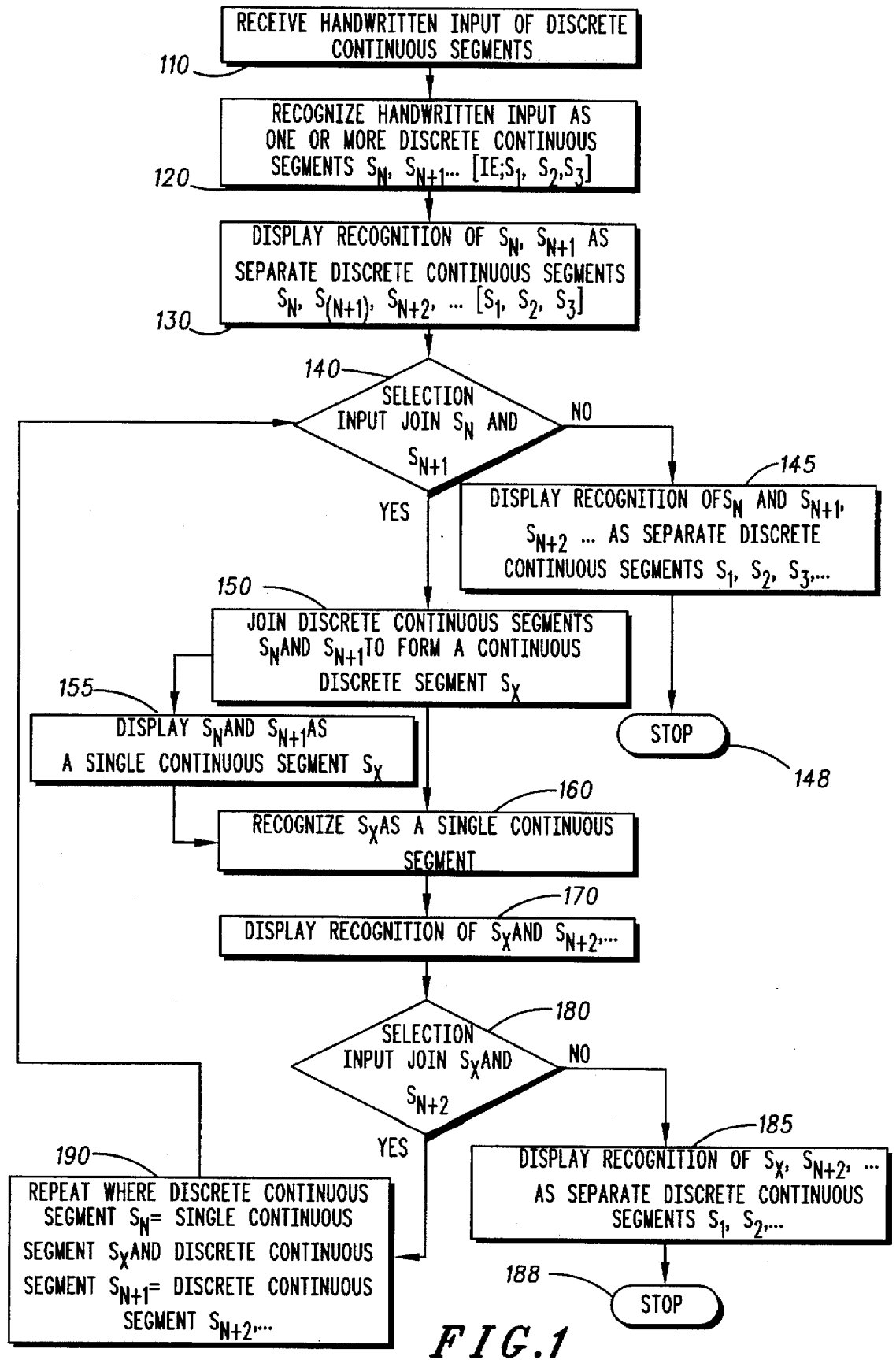
FIG. 1 Illustrates a flow diagram of operation in accordance with a preferred embodiment of the present invention.

Generally, the present invention as disclosed provides a user with the option of editing handwritten input such that the user may elect to join or combine one or more discrete continuous segments, or blocks of ink, to form a single discrete continuous segment. The joined segments are then presented as a single discrete segment and analyzed as a single discrete segment by the method of machine recognition of handwritten input being employed by a device that functions to receive handwritten input, such as a Personal Digital Assistant (PDA). The recognition of the single discrete segment that results is then displayed to the user.

In a preferred embodiment of the present invention the handwritten input is alphanumeric, the writing axis is horizontal, and the writing direction is left to right. In accordance with this preferred embodiment, the handwritten input and the resultant recognition are displayed concurrently and in close juxtaposition to each other. This close juxtaposition allows the user to refer to their original handwritten input when correcting errors in the processing and recognition of the handwritten input.

Typically, handwritten character input is collected from the user in the form of discrete continuous segments. A discrete continuous segment consists of one or more pen strokes, where a pen stroke is the mark left by a pen during its period of contact with an input device such as a digitizing tablet or paper. A stroke is represented as a sequence of points sampled at approximately regular intervals by the input device. Each point is described at minimum by an X coordinate and a Y coordinate. Strokes may be captured electronically using a digitizing tablet, or an alternative embodiment may be derived from a scanned or faxed image through a process of line detection in the image; such methods of capturing input electronically are understood in the art.

In the present invention one or more discrete continuous segments are the units of handwritten input being recognized. Handwritten input is input which is captured electronically that includes but is not limited to the following: handwritten input; electronic input; input captured through pressure, such as stamped input; input that is received electronically, such as via facsimile, pager, or other device. For purposes of explanation of the present invention, handwritten input is typically presented along a writing axis in a direction which is defined as the writing direction. The writing axis is the line along which the handwritten input is added. The writing direction is the direction in which each subsequent handwritten input is added. For example, in English, handwritten input is added typically along a horizontal writing axis with each subsequent alphanumeric input following horizontally after the previous input in a writing direction that is left to right. Various other writing axis and writing directions are possible with implementation of the teachings of the present invention.

In a preferred embodiment, the handwriting axis is horizontal and the handwritten input forms a series of words. In this preferred embodiment, the continuous discrete segments are entered horizontally from left to right. In an alternative preferred embodiment, the handwriting axis is horizontal and the handwritten input forms a series of separate characters, which may be alphanumeric characters, ideographic characters as found in languages such as Chinese, or other forms of characters or symbols of written communications. In this alternative embodiment, the output tells whether the discrete continuous segments belong to separate characters. In another preferred embodiment, the handwriting axis is vertical and the handwritten input forms a series of separate characters, which may be alphanumeric characters, ideographic characters, or other handwritten input. In this preferred embodiment, the writing axis is vertical and the output tells whether the discrete continuous segments belong to separate characters. In another preferred embodiment, the handwriting axis is vertical and the handwritten input forms a series of separate words, alphanumeric input, or other handwritten input, such as a vertical list of words, or numbers. In this preferred embodiment, the writing axis is vertical and the output tells whether the discrete continuous segments belong to separate handwritten input, such as separate words.

As disclosed above and as will be discussed further, the present invention demonstrates through the disclosure of several of the preferred embodiments that the writing axis may exist at any angle and the handwritten input may be interpreted more generally as corresponding to discrete elements (including but not limited to characters and words) containing one or more discrete continuous segments. The application of the methods described herein to any of various preferred embodiments requires only a change in the coordinate system used and such modifications can be made in accordance with the teachings presented.

Referring now to the Figures, a personal digital assistant (PDA) is generally depicted by reference numeral 100. The PDA 100 depicted constitutes a generic representation and may be comprised for example of a Newton™ or other personal digital assistant device, or other pen based computing device. Such devices typically include a housing and a touch screen upon which input, such as words, can be handwritten using an appropriate hand manipulated stylus, or other input device. Such PDA and pen based computing devices typically include one or more microprocessors or other digital processing devices. These devices comprise computational platforms that can be readily programmed in accordance with the teachings presented herein. It should be understood that, while such devices as personal digital assistants and pen based computing devices comprise ready platforms to accommodate the practice of applicant's teachings, the teachings presented herein may be practiced in a variety of other operating environments as well. Some examples of such environments include computers with digitizing screens, or which are connected to a digitizing input surface, or capable of receiving faxed or scanned image input, or digital or interactive televisions, modems, pagers, or other systems with the ability to capture handwritten input and process it.

Referring now to FIGS. 1 through 7, preferred embodiments of the present invention are illustrated. The present invention is applicable to one or more handwritten inputs of discrete continuous segments, or blocks of ink. In FIGS. 2 through 6, the use of three discrete continuous segments, or blocks of ink, $S_1$, $S_2$, and $S_3$ of handwritten alphanumeric input is for illustrative purposes only. In FIGS. 1 through 11, $S_1$, $S_2$, and $S_3$ correspond respectively to $S_n$, $S_{n+1}$, and $S_{n+2}$. FIGS. 8 through 11 illustrate alternative preferred embodiments of the present invention where the handwritten input, writing axis, and writing direction are varied from those shown represented in FIGS. 1 through 7.

Referring now to FIG. 1, a preferred method of the present invention is illustrated. In the preferred method illustrated in FIG. 1, handwritten input consisting of three discrete continuous segments $S_1$, $S_2$ and $S_3$ (110) is accepted by a device, such as a PDA or other device. Upon receipt of the handwritten input, the input is analyzed by a handwriting recognition method executing on the PDA, or other device being employed, to provide an alphanumeric recognition that corresponds to, or represents the corresponding handwritten input (120). In accordance with this preferred embodiment, the recognition for each, $S_1$, $S_2$, and $S_3$ is displayed to the user (130). Preferably, the recognition of $S_1$, $S_2$ and $S_3$ is displayed in close juxtaposition to a digitized representation of the original handwritten input of $S_1$, $S_2$ and $S_3$, as described previously. Once the recognition is displayed (130) the user may select to input, or edit (140), the displayed recognition (130) of $S_1$, $S_2$ and $S_3$. If the user does not enter a selection input a recognition is displayed for each $S_1$, $S_2$ and $S_3$ 145 and the process stops 148.

If, however, the user selection input is a join instruction 150 and the user selection input is an instruction to join discrete continuous segments $S_1$ and $S_2$, a single continuous discrete segment $S_x$ is formed. In a preferred embodiment of the present invention upon the selection of a join instruction 150, the digitized representation of the original handwritten input of $S_1$ and $S_2$ is graphically displayed 155 as single continuous handwritten input to the user representing the single continuous discrete segment $S_x$ (See also FIGS. 6 and 7). The single continuous discrete segment $S_x$ is analyzed by the handwriting recognition method executing on the PDA, or other device, 160, in accordance with a handwriting recognition method described previously 120. The teachings of the present invention may be employed by a variety of handwriting recognition methods. The recognition for $S_x$ is displayed to the user 170. Preferably, the recognition of $S_x$ is displayed 170 in close juxtaposition to a digitized representation of the original handwritten input of $S_1$ and $S_2$, as described previously 130, or to a joined $S_1$ and $S_2$ digitized representation of the original handwritten input as described in 155. Once the recognition of $S_x$ is displayed 170 the user may again enter a selection input 180, and may enter a repeat select input instruction 190 to join $S_x$ with another discrete continuous segment, for example $S_3$, or $S_{n+2}$, (provided there is another such segment). In accordance with the preferred method of the present invention a user may continue with one or more selection input instruction to join until the user no longer selects a join instruction or there are no individual discrete continuous segments remaining to join.

Figure 2:
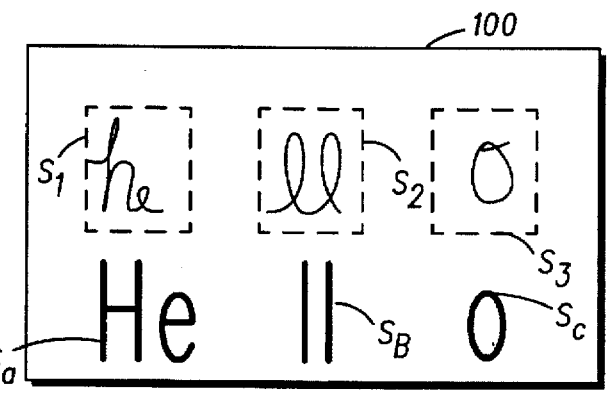
FIG. 2 Illustrates a graphical view of an illustrative display in accordance with a preferred embodiment of the present invention.
Figure 3:
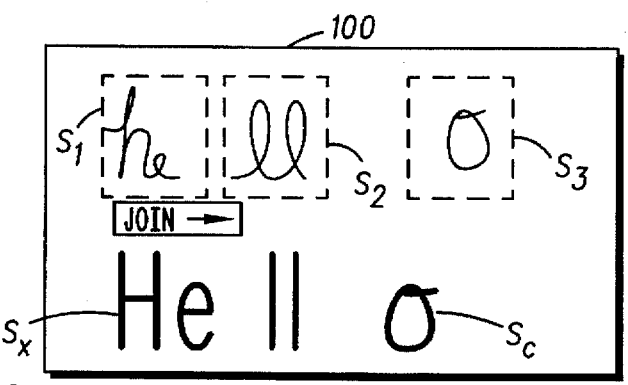
FIG. 3 Illustrates a graphical view of an illustrative display in accordance with a preferred embodiment of the present invention.
Figure 4:
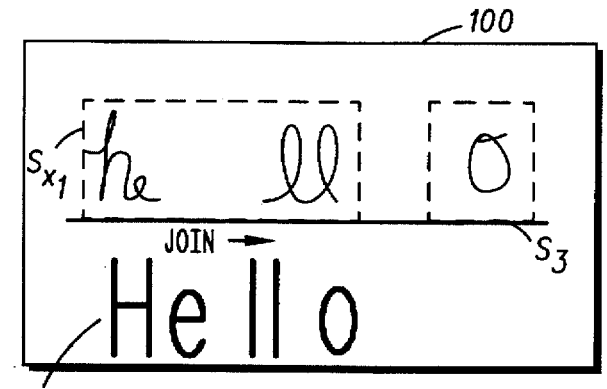
FIG. 4 Illustrates a graphical view of an illustrative display in accordance with a preferred embodiment of the invention.

Referring now to FIGS. 2 through 4 a graphical representation, as described in FIG. 1, is given for a preferred embodiment. In this embodiment the discrete continuous segments $S_1$, $S_2$, and $S_3$ are recognized as separate segments $S_a$, $S_b$, and $S_c$. This is illustrated in FIG. 2. The dotted lines surrounding $S_1$, $S_2$, and $S_3$ are provided for illustrative purposes only to identify more clearly the discrete continuous segments that comprise $S_1$, $S_2$, and $S_3$. $S_a$, $S_b$, and $S_c$ represent the recognition result displayed to the user (FIG. 1, 130) for $S_1$, $S_2$, and $S_3$ respectively. The user, or input device, is given the opportunity to enter a selection input instruction (FIG. 1, 140). If the user, or input device, selects a join instruction input, then in accordance with a preferred embodiment the discrete continuous segments of $S_1$ and $S_2$ are joined to form a single continuous discrete segment $S_x$, illustrated in FIG. 3 (see also FIG. 1, 150). The segment $S_x$ is analyzed as a single continuous discrete segment according to the handwriting recognition method executing on the input device. The recognition of $S_x$ is displayed to the user or input device. Preferably the recognition of $S_x$ is displayed in close juxtaposition to the digitized representation of the original handwritten input of $S_1$ and $S_2$, as illustrated in FIG. 3.

Referring now to FIG. 4, if an additional selection input instruction is received from the user, or input device, and the input is a join instruction, the continuous discrete segment $S_x$ [assigned the value $S_{x1}$ in FIG. 4 for illustrative purposes (where $S_n=S_x$ in FIG. 1, 190)] is joined with the discrete continuous segment $S_3$. The combination forms a new single continuous discrete segment, illustrated in FIG. 4 as the recognized segment $S_{x2}$, where $S_{x2}=S_{x1}+S_3$. (In FIG. 1, 190, the value of $S_n$ is now assigned the value of $S_x$ and the value of $S_{n+1}$ is assigned the value of $S_{n+2}$, etc. . . . ). Preferably, in accordance with the embodiment illustrated in FIG. 4, the recognition of $S_{x2}$ is displayed to the user, or input device. More preferably the recognition of $S_{x2}$ is displayed in close juxtaposition to the digitized representation of the joined handwritten input of $S_{x1}$ (equal to $S_1$ and $S_2$), and the digitized representation of the original handwritten input of $S_3$ as illustrated in FIG. 4. The advantage of the preferred embodiment of the present invention illustrated in FIGS. 1 through 4, allows a user, or input device, to repeatedly join an infinite amount of discrete continuous segments, $S_n$, $S_{n+1}$, $S_{n+2}$, . . . etc., to repeatedly form a single continuous discrete segment $S_x$. More preferably the user, or input device, can repeatedly join an infinite amount of discrete continuous segments, in either a positive or negative direction, i.e. $S_n$, $S_{n\pm1}$, $S_{n\pm2}$, to repeatedly form a single discrete segment $S_x$. This preferred alternative allows the user a variety of editing capabilities.

Figure 5:
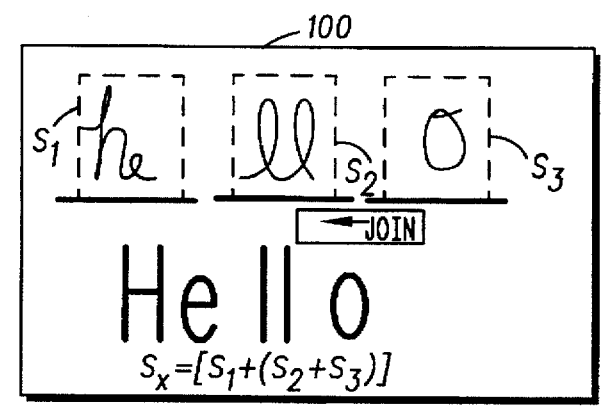
FIG. 5 Illustrates a graphical view of an illustrative display in accordance with an alternative preferred embodiment of the present invention.

Referring now to FIG. 5, an alternative preferred embodiment of the present invention is graphically illustrated. This alternative preferred method is substantially similar to that described above for FIGS. 1 through 4. However, in accordance with this preferred alternative a user may select one or more discrete continuous segments to be joined. By way of example, in FIG. 5 assume the steps illustrated in FIG. 1 as 110 through 130 are substantially similar. In this preferred alternative, a user selection input is received and the selection input is a join instruction (refer to FIG. 1, illustrated as steps 140 through 150). However in accordance with this preferred embodiment, the join instruction of FIG. 5, is an instruction to join discrete continuous segment $S_2$ and $S_3$ simultaneously with $S_1$, [In this preferred embodiment $S_2=S_n$; $S_3=S_{n+1}$; and $S_1=S_{n-1}$.] thereby joining more than two discrete continuous segments to form one continuous discrete segment $S_x$. The continuous discrete segment $S_x$ is then processed in a method substantially similar to the method illustrated in FIG. 1 as steps 140 through 190. An advantage of this preferred embodiment is to allow the user to join an infinite amount of discrete continuous segments, in either a positive or negative direction, $S_n$, $S_{n\pm1}$, $S_{n\pm2}$, etc., simultaneously to form a single continuous discrete segment $S_x$. This preferred alternative allows the user a variety of editing capabilities.

Figure 6:
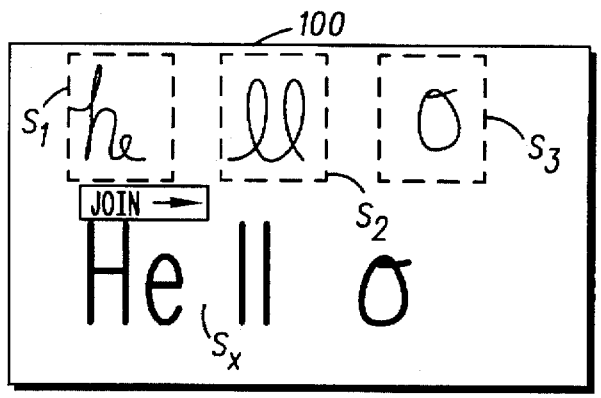
FIG. 6 Illustrates a graphical view of an illustrative display in accordance with an alternative preferred embodiment of the present invention.
Figure 7:
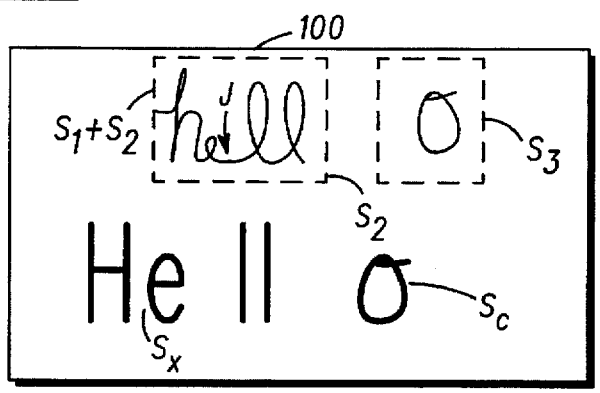
FIG. 7 Illustrates a graphical view of an illustrative display in accordance with an alternative preferred embodiment of the present invention.

Turning to FIGS. 6 and 7, a preferred embodiment of the present invention is graphically illustrated. In this preferred embodiment, upon selection of a join instruction (FIG. 1, 150), the digitized representation of the original handwritten input of $S_1$ and $S_2$ is graphically displayed as a single continuous handwritten input to the user, being joined at point J of FIG. 7, wherein the joined $S_1$ and $S_2$ represent single discrete segment $S_x$. Preferably, the recognition of $S_x$ is displayed in close juxtaposition to the digitized representation of the joined handwritten input of $S_1$ and $S_2$. This preferred embodiment is applicable to the teachings of the inventions regardless of the writing axis, writing direction, or nature of the handwritten input by modification of the coordinate systems.

Figure 8:
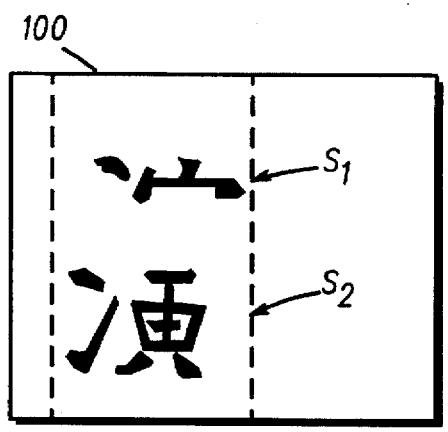
FIG. 8 Illustrates a graphical view of an illustrative display in accordance with an alternative preferred embodiment of the present invention.
Figure 9:
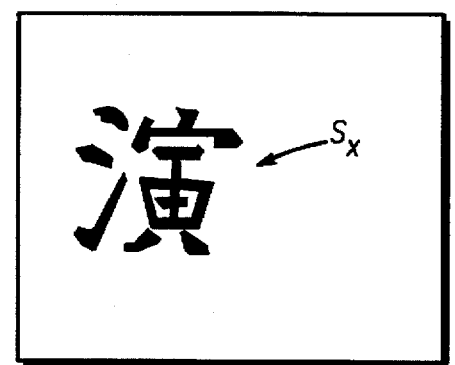
FIG. 9 Illustrates a graphical view of an illustrative display in accordance with an alternative preferred embodiment of the present invention.

Referring now to FIGS. 8 through 11, alternative preferred embodiments of the present invention are graphically illustrated. These alternative preferred embodiments are presented for illustrative purposes, and in no way exhaust the various preferred embodiments and alternative preferred embodiments of the teachings of the present invention. FIGS. 8 and 9 represent an embodiment of the present invention substantially similar to those discussed in FIGS. 1 through 7. However, in this embodiment the handwritten input represents characters, the writing axis is vertical, and the writing direction is vertical. In this alternative preferred embodiment a selection input instructing a join is received. The handwritten inputs $S_1$ and $S_2$ are joined to form a single continuous segment $S_x$, of handwritten input, as illustrated in FIG. 9. The single continuous segment $S_x$ is then recognized and displayed to the user, or input device, in substantially the same manner as illustrated in FIGS. 1 through 7.

Figure 10:
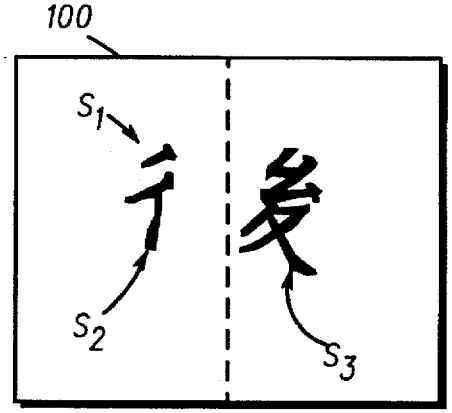
FIG. 10 Illustrates a graphical view of an illustrative display in accordance with an alternative preferred embodiment of the present invention.
Figure 11:
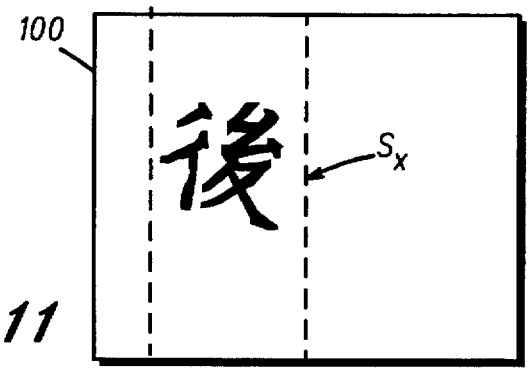
FIG. 11 Illustrates a graphical view of an illustrative display in accordance with an alternative preferred embodiment of the present invention.

Referring now to FIGS. 10 and 11, an embodiment of the present invention substantially similar to those discussed in FIGS. 1 through 7, is represented. However in this embodiment the handwritten input represents characters, the writing axis is right to left and the writing direction is vertical. In this alternative preferred embodiment a selection input instructing a join is received. The handwritten inputs $S_1$, $S_2$ and $S_3$ are joined to form single continuous segment $S_x$, of handwritten input, as illustrated in FIG. 11. The single continuous segment $S_x$ is then recognized and displayed to the user, or input device, in substantially the same manner as illustrated in FIGS. 1 through 7.

It will be apparent to those skilled in the art that the disclosed invention may be modified in numerous ways and may assume many embodiments other than the preferred forms particularly set out and described above. Accordingly, it is intended by the appended claims to cover all modifications of the invention that fall within the true spirit and scope of the invention and its equivalents.

What is claimed is:

1. A method for facilitating recognition of handwriting input, comprising the steps of:

receiving electronic data comprising a series of data points that correspond to an original handwritten input;

generating recognized words that correspond to the original handwritten input;

displaying the recognized words;

receiving user selection input comprising a join instruction;

upon receiving the join instruction, automatically joining at least a selected series of data points that correspond to a first portion of original handwritten input with a second series of data points that correspond to a second portion of original handwritten input to provide a joined series of data points;

performing a recognition operation on the joined series of data points; and displaying a new recognized word that comprises a recognized word that corresponds to the joined series of data points.

2. A method for facilitating recognition of handwritten input comprising the steps of:

receiving electronic data comprising a series of data points that correspond to an original handwritten input;

generating digitized data comprising at least one block of ink that corresponds to the original handwritten input;

computing recognized words that correspond to the original handwritten input;

displaying the recognized words;

receiving user selection comprising a join instruction;

upon receiving the join instruction, automatically joining at least a selected series of data points that correspond to a first block of ink with a second series of data points that correspond to a second block of ink to provide a joined series of data points;

performing a recognition operation on the joined series of data points; and displaying a new recognized word that comprises a recognized word that corresponds to the joined series of data points.

3. A method, comprising the steps of:

displaying to a user of a character recognizer computed word, character or symbol segments representing input word, character, or symbol segments from which the user may select any number of the computed word, character, or symbol segments to be joined;

combining the number of computed word, character, or symbol segments selected by the user;

performing, following said step of combining, a recognition operation on raw unrecognized data corresponding to the combined number of computed word, character, or symbol segments selected by the user to provide a new computed word, character or symbol segments; and displaying the new computed word, character or symbol segments.

4. A method, according to claim 3 wherein the step of displaying to a user of a character recognizer computed word, character or symbol segments representing input word, character, or symbol segments includes displaying the computed word, character, or symbol segments.

5. A method, according to claim 3 wherein the step of displaying the new computed word, character, or symbol segments comprises displaying the new computed word, character or symbol segments in proximity to the input word, character, or symbol segments.

6. A method, according to claim 3 wherein the step of combining the number of computed word, character, or symbol segments selected by the user further includes combining the input word, character, or symbol segments represented by the selected computed word, character, or symbol segments.

7. A device comprising:

a display to display to a user of a character recognizer computed word, character or symbol segments representing input word, character, or symbol segments from which the user may select any number of the computed word, character, or symbol segments to be joined to provide a new computed word, character, or symbol segments; and a computing device coupled to the display to combine the number of computed word, character, or symbol segments selected by the user, to provide a combined number of word, character, or symbol segments, wherein the computing device processes portions of an original handwritten input data representing the combined number of word, character, or symbol segments with a handwriting recognition process to provide the new computed word, character, or symbol segments.

8. A device according to claim 7, wherein the computing device processes data representing the input word, character, or symbol segments with a handwriting recognition process to provide the computed word, character, or symbol segments.

9. A device according to claim 7 wherein the display displays the combined number of computed word, character, or symbol segments in proximity to the input word, character, or symbol segments.

10. A device according to claim 7 wherein the computing device combines the input word, character, or symbol segments represented by the selected computed word, character, or symbol segments.

11. A device according to claim 7 wherein the display is coupled to a handwriting input device and receives the input word, character, or symbol segments from the handwriting input device.

12. A device according to claim 7 wherein the display is a digitizing display.

13. A device according to claim 7 wherein the display is coupled to a digitizing tablet and receives the input word, character, or symbol segments from the digitizing tablet.

14. A device according to claim 7 wherein the display is coupled to a pager or modem and receives the input word, character, or symbol segments from the pager or modem.

15. A method, comprising the steps of:

receiving data representing handwritten input entered upon a digitizing display;

displaying a representation of the handwritten input at substantially the display location at which the handwritten input was entered;

processing the data to provide discrete continuous segments representing portions of the handwritten input;

applying the discrete continuous segments to a handwriting recognition process to provide recognized words, characters, or symbols displayed proximately to the representation of the handwritten input;

joining selected recognized words, characters, or symbols responsive to one or more user instructions;

reapplying the data to the handwriting recognition process, following the step of joining, without further handwritten input data; and applying joined discrete continuous segments representing the words, characters, or symbols joined by the user instructions to display another recognized word, character, or symbol proximate to the representation of the handwritten input associated with the words, characters, or symbols joined by the user instructions.

16. A method, comprising the steps of:

receiving data representing handwritten input entered along a writing axis and displaying a representation of the handwritten input;

processing the data to provide discrete continuous segments representing portions of the handwritten input;

applying the discrete continuous segments to a handwriting recognition process to provide recognized words, characters, or symbols displayed proximately to the representation of the handwritten input;

joining one or more selected adjacent recognized words, characters, or symbols along the writing axis responsive to one or more user instructions;

reapplying the data to the handwriting recognition process, following the step of joining, without further handwritten input data; and applying joined discrete continuous segments representing the joined words, characters, or symbols to display another recognized word, character, or symbol proximate to the representation of the handwritten input associated with the joined words, characters, or symbols.

17. A device, comprising:

a display for displaying a representation of handwritten input; and processing circuitry programmed to provide a handwriting recognition process through which data representing the handwritten input is processed to provide recognized words, characters, or symbols to the display, and programmed to join selected words, characters or symbols responsive to user instructions and reprocess in the handwriting recognition process portions of an original handwritten input corresponding to the joined words, characters, or symbols to provide another recognized word, character or symbol.

18. A device according to claim 17 wherein the display displays the recognized words, characters, or symbols where the user selects which of the recognized words, characters, or symbols are to be joined.

19. A device according to claim 17 wherein the another recognized word, character or symbol is displayed on the display.

20. A device according to claim 17 wherein the data is received from a handwriting input device.

21. A device according to claim 17 wherein the data is received from a digitizing display.

22. A device according to claim 17 wherein the data is received from a digitizing tablet.

23. A device according to claim 17 wherein the data is received from a pager or modem.

24. A device according to claim 17 wherein the data is received from a scanned image.

* * * * *